(12) United States Patent
Kerforn et al.

(10) Patent No.: US 11,435,030 B2
(45) Date of Patent: Sep. 6, 2022

(54) PRESSURIZED GAS TANK

(71) Applicant: FAURECIA SYSTEMES D'ECHAPPEMENT, Nanterre (FR)

(72) Inventors: Patrice Kerforn, Dol de Bretagne (FR); Joël Jolicor, Vieux-Charmont (FR)

(73) Assignee: FAURECIA SYSTEMES D'ECHAPPEMENT

(*) Notice: Subject to any disclaimer, the term of this patent is extended or adjusted under 35 U.S.C. 154(b) by 55 days.

(21) Appl. No.: 17/075,852

(22) Filed: Oct. 21, 2020

(65) Prior Publication Data

US 2021/0123565 A1    Apr. 29, 2021

(30) Foreign Application Priority Data

Oct. 24, 2019 (FR) ...................... 19 11929

(51) Int. Cl.
  *F17C 1/00*    (2006.01)
(52) U.S. Cl.
  CPC ........ *F17C 1/00* (2013.01); *F17C 2201/0104* (2013.01); *F17C 2205/0352* (2013.01); *F17C 2221/012* (2013.01); *F17C 2270/0168* (2013.01)
(58) Field of Classification Search
  CPC ................ F17C 1/00; F17C 2201/0104; F17C 2205/0352; F17C 2221/012;
  (Continued)

(56) References Cited

U.S. PATENT DOCUMENTS

| 6,230,922 B1 | 5/2001 | Rashe et al. |
| 8,967,417 B2 * | 3/2015 | Sharp ........................ F17C 1/16 220/240 |

(Continued)

FOREIGN PATENT DOCUMENTS

| CZ | 2014544 A3 | 1/2016 |
| DE | 2538433 A1 | 3/1977 |

(Continued)

OTHER PUBLICATIONS

French Preliminary Research Report dated Jun. 18, 2020 for French Application FR 1911929.

*Primary Examiner* — Don M Anderson
(74) *Attorney, Agent, or Firm* — Carlson, Gaskey & Olds, P.C.

(57) ABSTRACT

A tank for pressurized gas, such as hydrogen, comprises a structure, a base, a sealing jacket and a ring. The structure has a substantially cylindrical shape along an axis and includes at least one axial opening along the axis. The base is able to be positioned in said opening and comprises, on the inner side, a housing of revolution about the axis and a first fastener, and is pierced with at least one through pipe that is axial along the axis. The sealing jacket is flexible and tight, and is to cover the inner wall of the structure and comprises a neck able to be received in the housing. The ring is substantially of revolution about the axis, and comprises a second fastener able to cooperate with the first fastener in order to assemble the ring with the base, on the inner side, by bringing the ring closer to the base along the axis, so as to progressively press the neck between the ring and the base. The ring comes closer to the base following a movement parallel to the axis from the inside of the tank toward the outside. and A face of the housing opposite the neck and a face of the ring opposite the neck have a small taper.

13 Claims, 8 Drawing Sheets

(58) Field of Classification Search
CPC ...... F17C 2270/0168; F17C 2223/0123; F17C 2223/036; F17C 2260/036; F17C 1/06; F17C 13/00; F17C 2205/0305; F17C 2205/0302; F17C 2209/234; F17C 2209/228; F17C 2203/0604; Y02E 60/32
See application file for complete search history.

(56) References Cited

U.S. PATENT DOCUMENTS

| | | | |
|---|---|---|---|
| 9,316,357 B2 * | 4/2016 | Heo | F17C 1/16 |
| 2009/0255940 A1 * | 10/2009 | Murate | F17C 1/16 |
| | | | 220/661 |
| 2015/0292679 A1 * | 10/2015 | Ehgartner | F17C 13/06 |
| | | | 220/86.1 |
| 2017/0268724 A1 * | 9/2017 | Kanezaki | F17C 1/04 |

FOREIGN PATENT DOCUMENTS

| | | |
|---|---|---|
| DE | 19751411 C1 | 1/1999 |
| JP | 2001524653 A | 12/2001 |
| JP | 2014167346 A | 9/2014 |
| JP | 5979446 B | 8/2016 |
| JP | 2019516043 A | 6/2019 |
| WO | 0131253 A1 | 5/2001 |
| WO | 2017176712 A1 | 10/2017 |

\* cited by examiner

[Fig. 1]
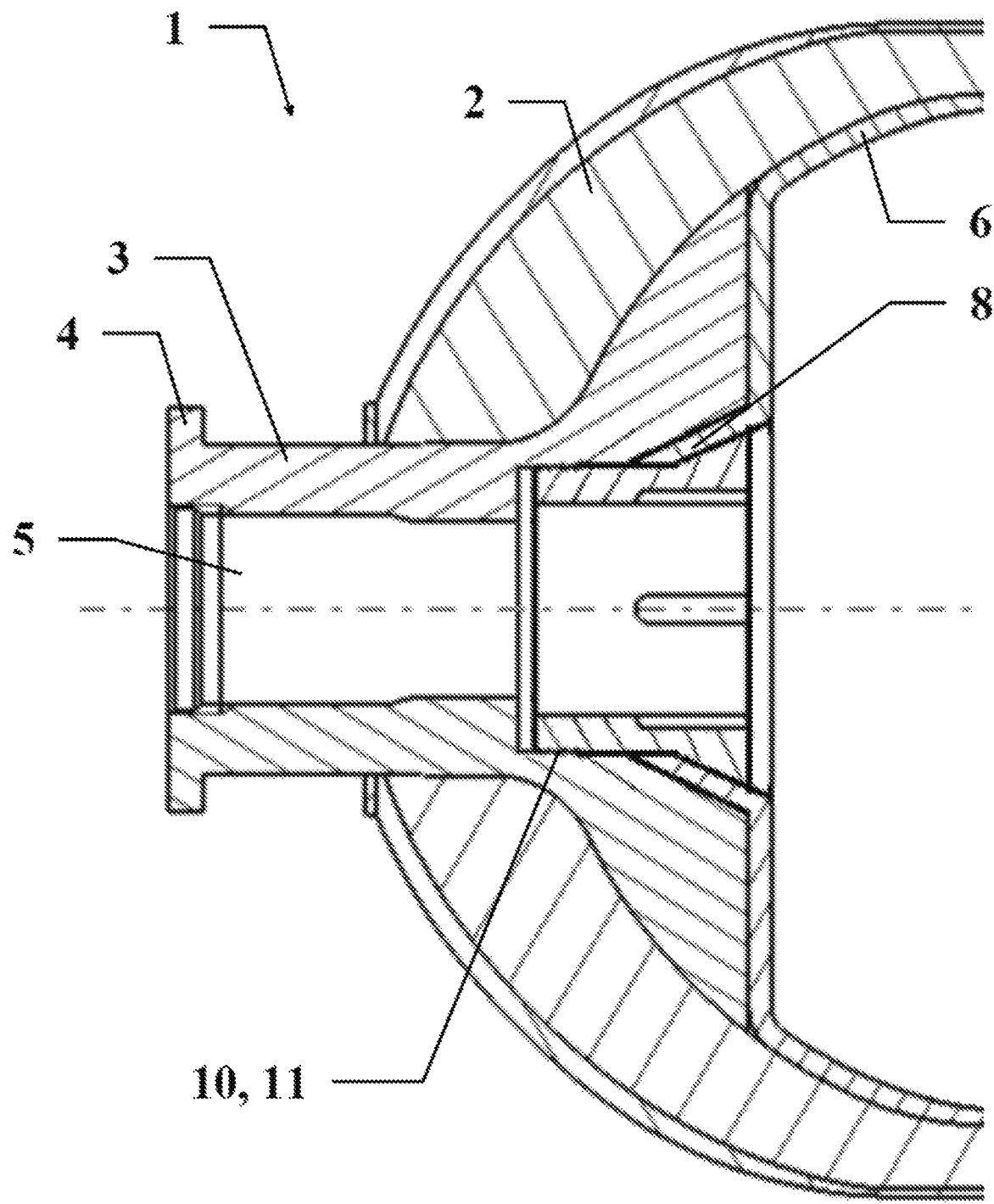

[Fig. 2]
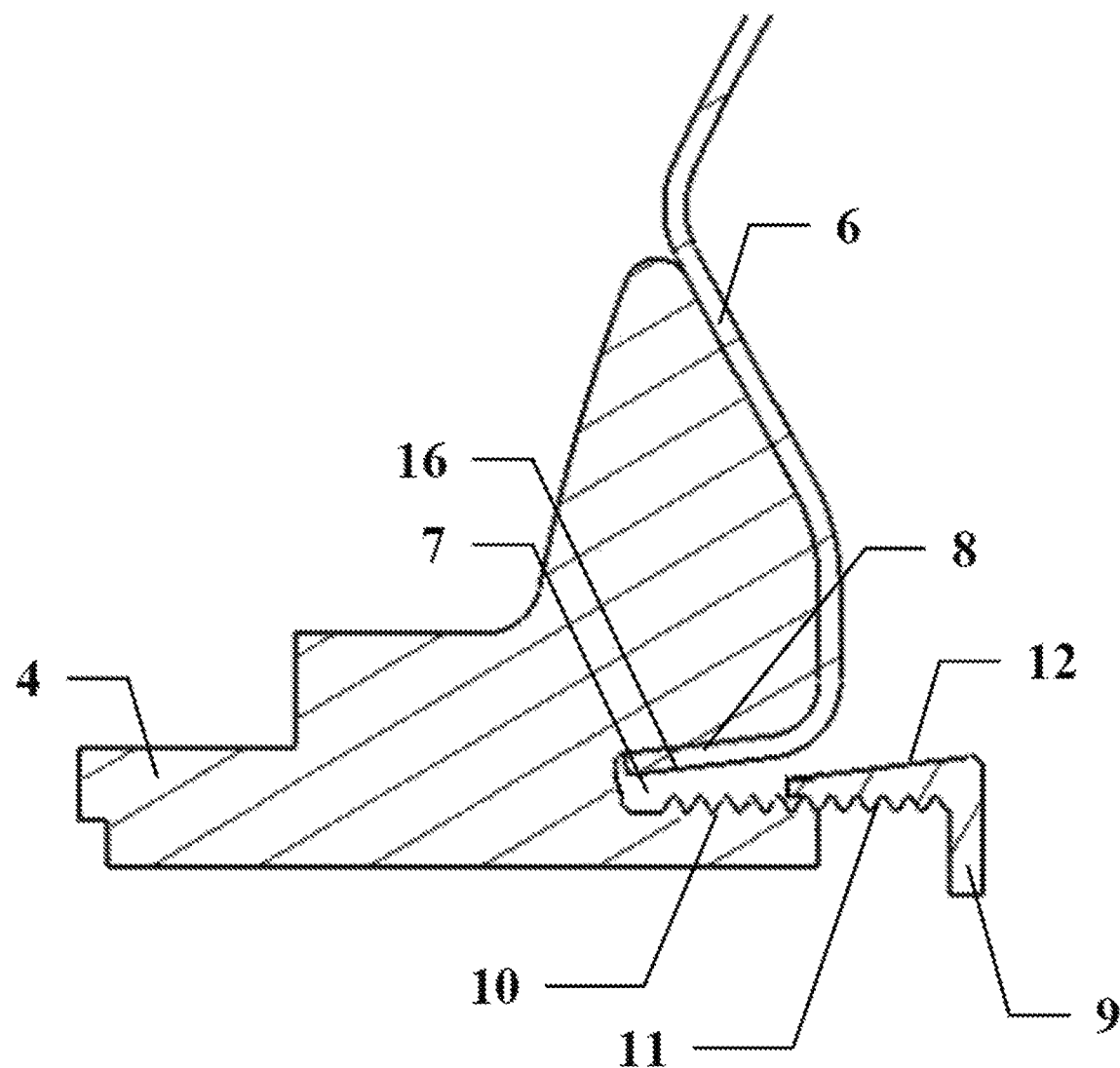

[Fig. 3]
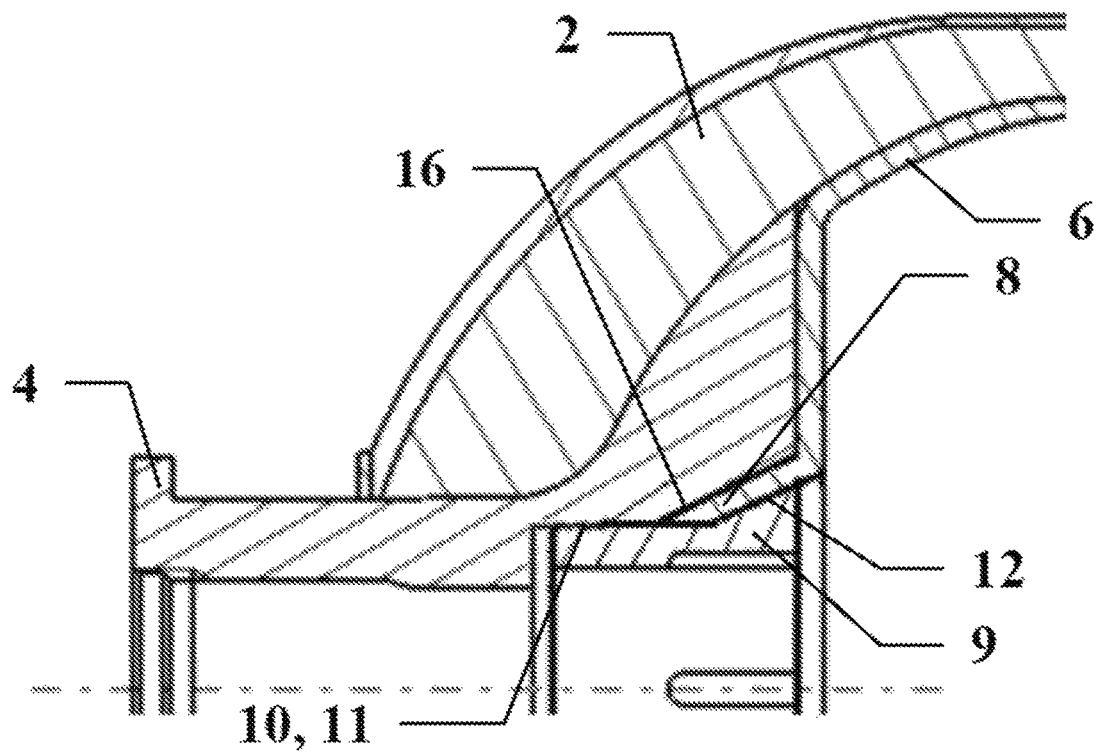
[Fig. 4]
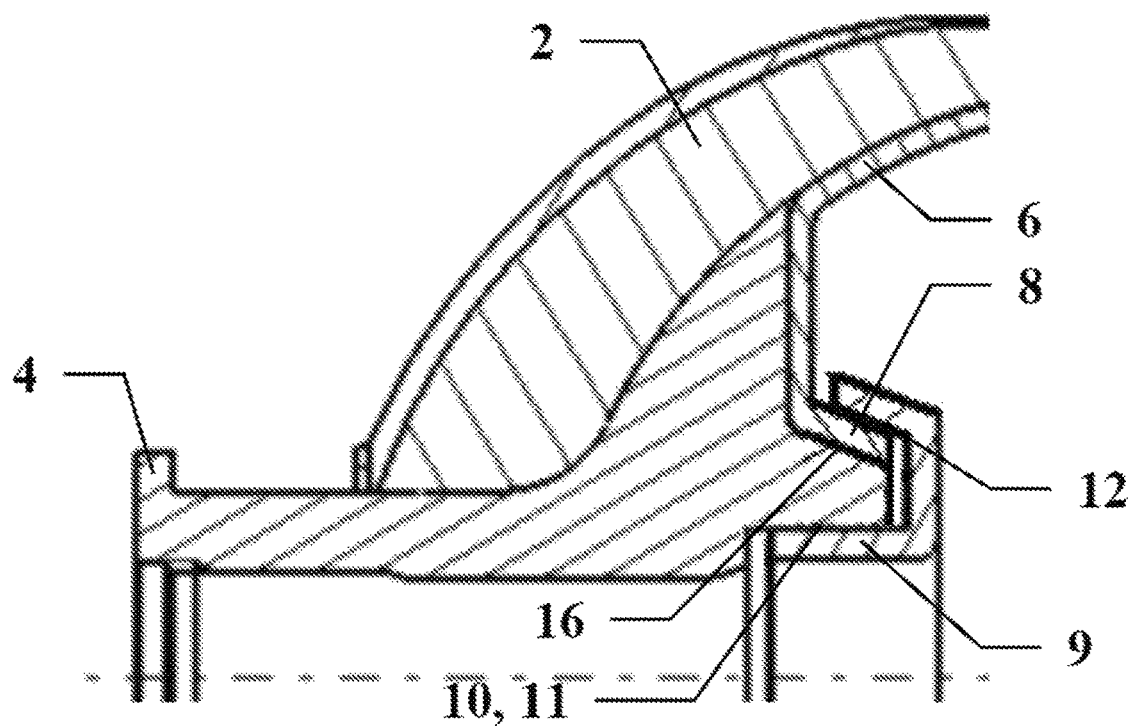

[Fig. 5]
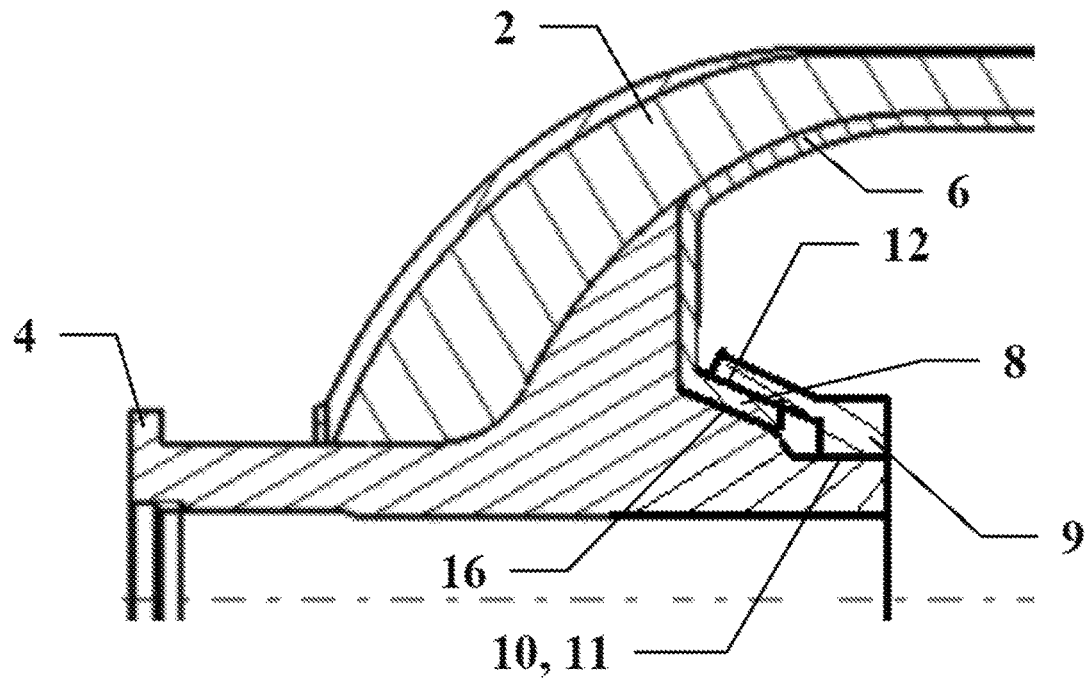
[Fig. 6]
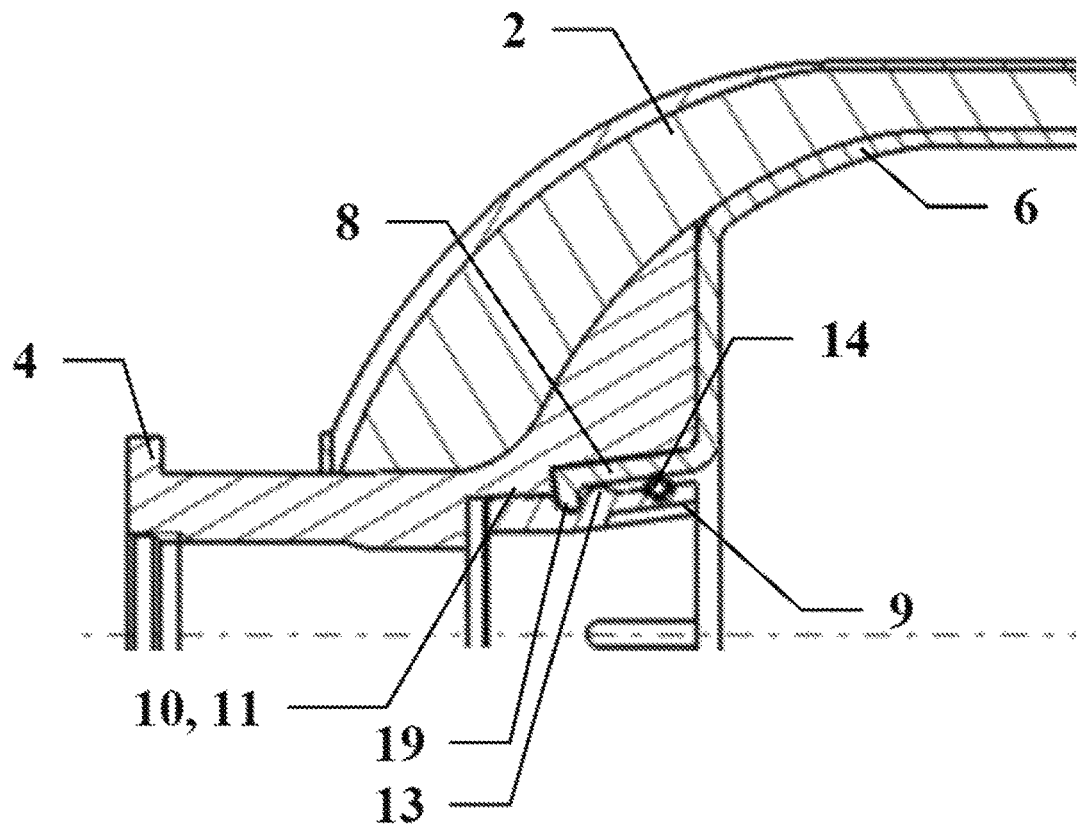

[Fig. 7]
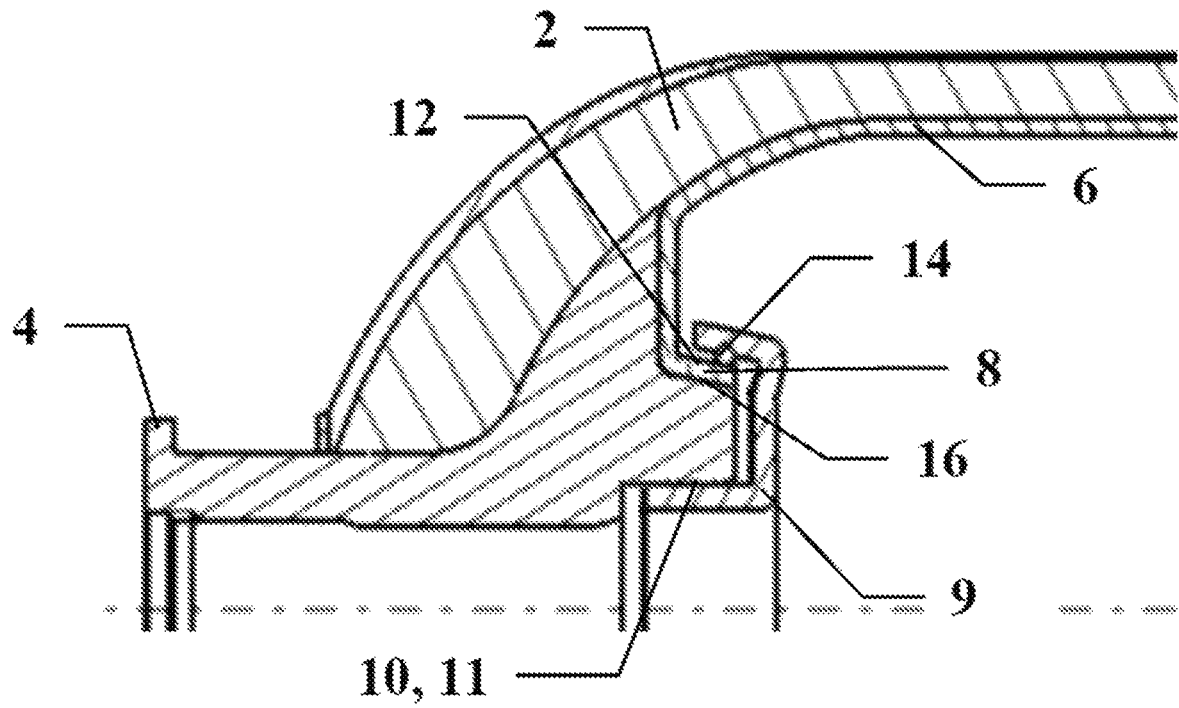
[Fig. 8]
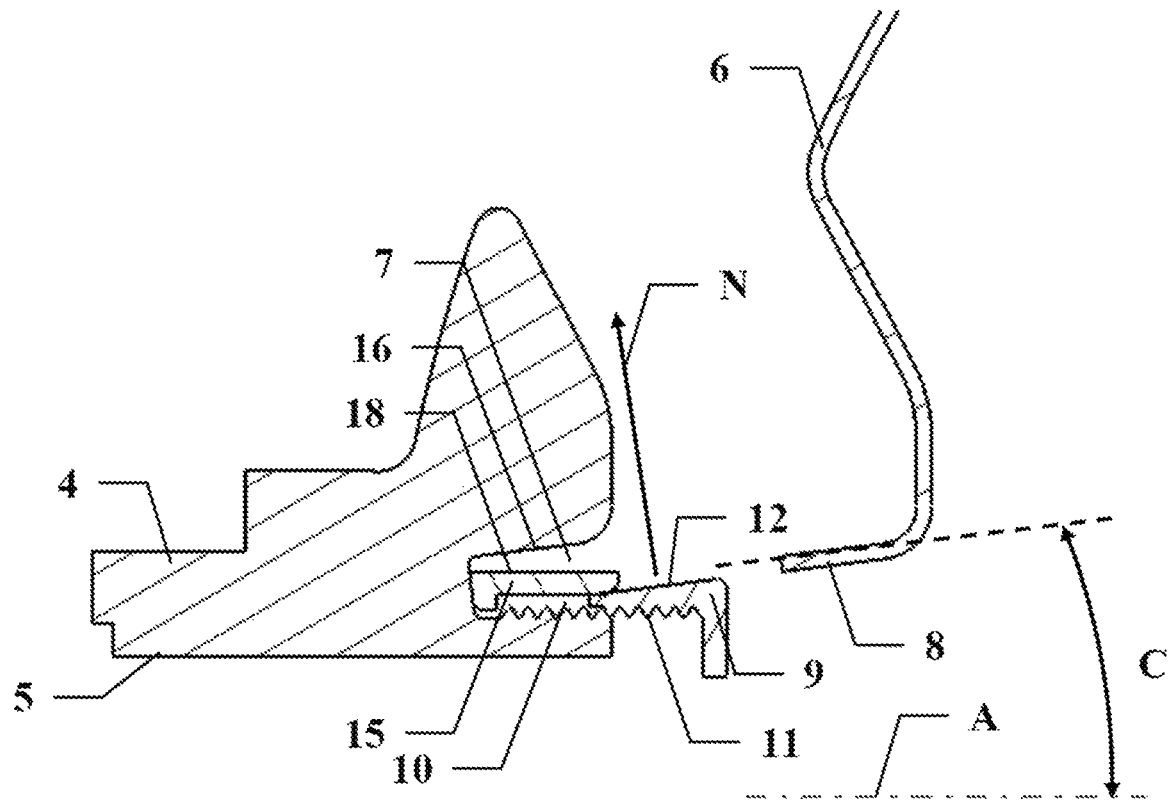

[Fig. 9]
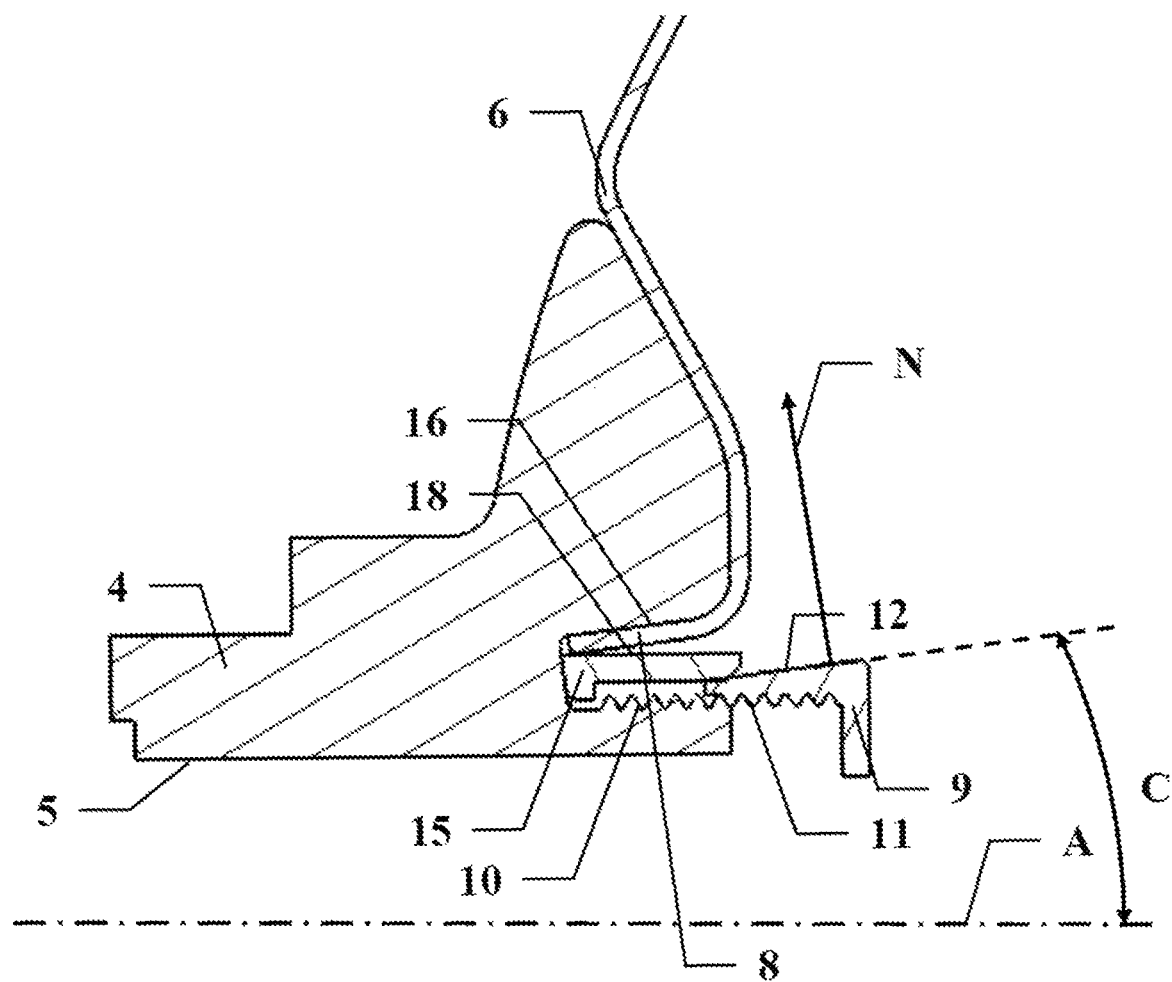

[Fig. 10]
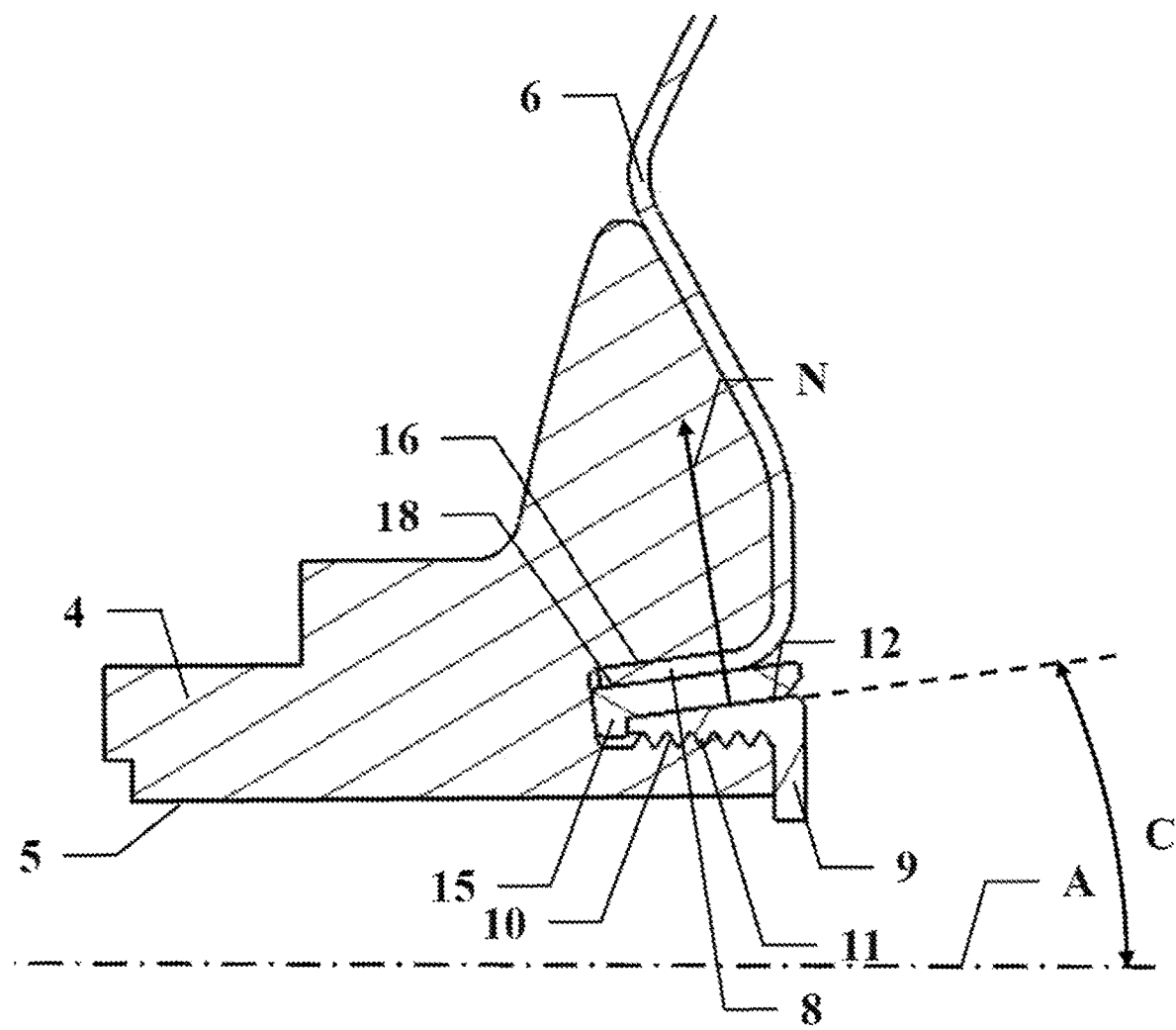

[Fig. 11]
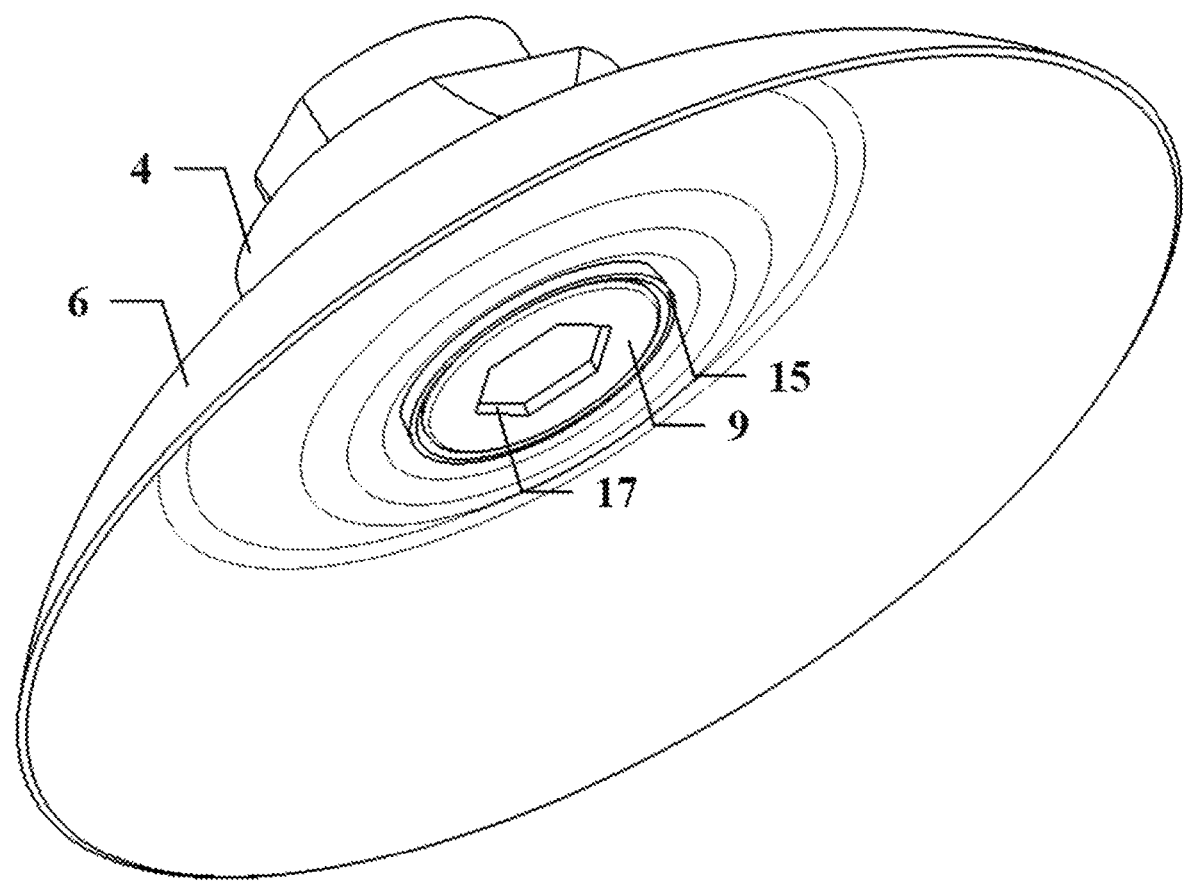

PRESSURIZED GAS TANK

CROSS-REFERENCE TO RELATED APPLICATIONS

This application is a U.S. non-provisional application claiming the benefit of French Application No. 19 11929, filed on Oct. 24, 2019, which is incorporated herein by reference in its entirety.

TECHNICAL FIELD

The disclosure relates to the field of tanks for pressurized gas, such as hydrogen.

According to one embodiment, such a tank comprises a structure, delimiting a volume of the tank, and a sealing jacket covering substantially the entire inner surface of the structure, so as to ensure tightness with respect to the gas. The structure is typically made from a composite and comprises an axial opening. A base, conventionally made from metal, is positioned in this opening. This base is pierced axially with a pipe allowing the filling and/or extraction of the tank. The sealing jacket, conventionally made from plastic, thermoplastic or elastomer material, comprises a neck able to be positioned opposite the pipe. It makes it possible to ensure the tightness between the neck and the base around the pipe.

It is known to glue the neck of the jacket on the base. It is not guaranteed that such a solution will satisfy the expected longevity specifications.

It is further known to use a ring, advantageously threaded so as to approach the base so as to press the neck of the jacket between the base and the ring. The elasticity of the jacket, combined with the pressing, ensures the tightness. In all of the embodiments of the prior art, the pressing plane is substantially perpendicular to the axis of the tank. As a result, the pressing force, which determines the tightness, is limited to the force that the thread can transmit.

Therefore, new solutions are sought to produce the tightness between the jacket and the base.

SUMMARY

To that end, the disclosure relates to a tank for pressurized gas, such as hydrogen, comprising a structure, a base, a sealing jacket and a ring. The structure has a substantially cylindrical shape along an axis, and includes at least one axial opening along the axis. The base is able to be positioned in said opening, and comprises, on the inner side, a housing of revolution about the axis and a first fastener, and is pierced with at least one through pipe that is axial along the axis. The sealing jacket is flexible and tight, and is able to cover the inner wall of the structure and comprises a neck able to be received in the housing. The ring is substantially of revolution about the axis, and comprises a second fastener able to cooperate with the first fastener in order to assemble the ring with the base, on the inner side, by bringing the ring closer to the base along the axis, so as to progressively press the neck between the ring and the base. The ring comes closer to the base following a movement parallel to the axis from the inside of the tank toward the outside. A face of the housing opposite the neck and a face of the ring opposite the neck have a small taper.

a. Specific features or embodiments, which may be used alone or in combination, are:
the taper is inclusively between 0° and 45°, preferably inclusively between 0 and 30°, and still more preferably inclusively between 0° and 20° of half cone angle,
the tank further comprises a deformable bushing, substantially of revolution about the axis, positioned between the face and the neck,
the face of the ring has a centrifugal normal and the taper has an opening toward the inside of the tank,
the face of the ring has a centripetal normal and the taper has an opening toward the outside of the tank,
the face of the ring and/or the face of the housing and/or a face of any bushing opposite the neck and/or at least one face of the neck further comprises at least one annular protuberance,
the tank further comprises at least one O-ring along the axis, positioned in a groove arranged in a face opposite the neck,
the first fastener comprises an inner thread and the second fastener comprises an outer thread,
the first fastener comprises an outer thread and the second fastener comprises an inner thread,
the ring has a noncircular inner profile around the axis, so as to allow the ring to be set in rotation about the axis, using a tool, from the outside of the tank, said inner profile preferably being hexagonal.

b. In a second aspect, the disclosure relates to a vehicle equipped with such a tank.

BRIEF DESCRIPTION OF THE DRAWINGS

The disclosure will be better understood upon reading the following description, provided solely as an example, and in reference to the appended figures, in which:
FIG. 1 shows an overview of a tank,
FIG. 2 illustrates a configuration with the taper toward the inside, centrifugal normal and inner thread of the ring,
FIG. 3 illustrates a configuration with the taper toward the inside, centrifugal normal and outer thread of the ring,
FIG. 4 illustrates a configuration with the taper toward the outside, centripetal normal and outer thread of the ring,
FIG. 5 illustrates a configuration with the taper toward the outside, centripetal normal and inner thread of the ring,
FIG. 6 illustrates the use of an annular protuberance,
FIG. 7 illustrates the use of an O-ring,
FIG. 8 shows a first step of the assembly, neck released,
FIG. 9 shows a second step of the assembly, neck engaged in the housing, ring loosened,
FIG. 10 shows a third step of the assembly, neck engaged, ring tightened, and
FIG. 11 illustrates an advantageous inner profile of the ring.

DETAILED DESCRIPTION

In reference to FIG. 1, a tank 1 for pressurized gas, such as hydrogen, comprises a structure 2, delimiting a volume of the tank 1. This structure 2 is typically made of composite, for example by filament winding. It advantageously has a substantially cylindrical shape along an axis A. The structure 2 ensures the mechanical strength of the tank 1, but is not sufficiently gas-tight. Therefore, a flexible and tight sealing jacket 6, also called liner, is added, substantially covering the entire inner surface of the structure 2, so as to ensure gas tightness.

The structure 2 comprises an axial opening 3 along the axis A. A base 4, conventionally made from metal, is positioned in this opening 3. This base 4 is pierced axially with a through pipe 5, substantially axial along the axis A, allowing the filling and/or extraction of the tank 1.

The base 4 further comprises, on the inner side of the base 4, i.e., the side facing toward the inside of the tank 1, a housing 7 of revolution about the axis A. The base 4 further comprises a first fastener 10.

The sealing jacket 6, conventionally made from plastic, thermoplastic, or elastomer material, comprises a neck 8 able to be positioned opposite the pipe 5, in the housing 7.

In order to ensure the tightness between the neck 8 and the base 4 around the pipe 5, a ring 9 is also used, positioned on the inner side, relative to the tank 1, able to press the neck 8 of the sealing jacket 6 between the base 4 and the ring 9. To that end, the ring 9 comprises a second fastener 11 able to cooperate with the first fastener 10 in order to assemble the ring 9 with the base 4. This assembly is done by progressively bringing the ring 9 closer to the base following a movement along the axis A, advantageously from the inside of the tank 1 toward the outside of the tank 1. The approach is advantageously progressive so as to progressively increase the pressure exerted on the neck 8. In response to this pressure, the jacket 6, which has a certain elasticity, ensures bearing, against the two opposite faces 12, 16, which ensures the tightness.

The ring 9 is advantageously made from a plastic material or a metal material. In case of metal material, the latter is chosen to be electrically compatible with the material of the base 4.

According to one important feature of the disclosure, the two walls that grip the neck 8, or the face 16 of the housing 7 opposite the neck 8 by a first face, on the one hand, and the face 12 of the ring 9 opposite the neck 8, by another opposite face, on the other hand, have a small taper C. Very advantageously, this feature acts as a force multiplier. Combined with the fasteners 10, 11, this taper C acts as a movement reducer and therefore as a force multiplier, multiplying the progressive mutual approach force of the base 4 relative to the ring 9, primarily axial, to create a transverse force that is even more increased as the taper C is small.

This multiplication makes it possible, relative to the force applied only by the fasteners 10, 11, to create a pressing force that is significantly greater than during a bearing of the two faces 12, 16, when these two faces 12, 16 are perpendicular to the direction, that of the axis A, of the force and therefore much better tightness obtained due to the bearing of the neck 8 on the face 12 of the base 4.

The tapers C of each of the two faces 12, 16 are advantageously substantially identical. Thus, the two faces 12, 16 are advantageously substantially parallel and thus press the neck 8 between them substantially uniformly.

A certain taper should be present. Therefore, the half cone angle of the cone cannot be zero. If the taper increases by too much, the multiplier effect is reduced. Therefore, the taper preferably has a half cone angle inclusively between 0° and 45°, more preferably inclusively between 0 and 30°, and still more preferably inclusively between 0° and 20°, 0° being excluded.

According to another advantageous feature, more particularly illustrated in FIGS. 8-10, the tank 1 also comprises a deformable bushing 15, positioned between the face 12 and the neck 8. Such a bushing 15 is a part of revolution, which ensures an interface between the face 12 of the ring 9 and the opposite face of the neck 8. This bushing 15 can be made from any material, metal and/or plastic. This bushing 15 advantageously makes it possible to provide a buffer between the two opposite faces. In the case of fasteners 10, 11 with screws, the neck 8 is fixed while the face 12 rotates and thus rubs against the face of the neck 8. Placing a bushing 15 between the two faces makes it possible to facilitate the rubbing, including when significant pressure is present, while avoiding risking damaging the most fragile part, namely the neck 8. To that end, the bushing 15 can advantageously be made from a lubricating material. The bushing 15 is advantageously deformable so as to follow the increase in diameter produced by the taper C. Alternatively or additionally, another similar bushing can be positioned between the face 16 of the base 4 and the neck 8.

The principle of the taper being set out, several embodiments are possible. It is assumed that in all cases, the ring 9 is located on the inner side of the base 4, facing the inside of the tank 1, and that the fasteners 10, 11 are such that the ring 9 approaches the base 4 by moving along the axis A from the inside toward the outside, or from right to left in the plane of the figures.

It appears that the orientation of the taper C is in relation to the orientation of the face 12. Thus, as illustrated in FIGS. 2 and 3, according to a first embodiment, the face 12 of the ring 9 has a centrifugal normal N, or a normal N moving away from the axis A; the taper should then open toward the inside of the tank 1. On the contrary, as illustrated in FIGS. 4 and 5, according to another embodiment, the face 12 has a centripetal normal N, or a normal N approaching the axis A; the taper should then open toward the outside of the tank 1.

According to another optional feature, as illustrated in FIG. 6, the face 12 also advantageously comprises at least one annular protuberance 13. Such a protuberance 13 has a transverse profile and is of revolution about the axis A. Such a protuberance 13, during the pressing of the neck 8 between base 4 and ring 9, creates at least one annular overpressure line and therefore a line where the neck is overpressed. This overpressure, in that it is linear, and therefore more localized, can be significantly greater than the compression applied on average over all of the neck 8 when it is distributed. Therefore, an increased tightness can thus be obtained. Additionally or alternatively, the face 16 also advantageously comprises at least one annular protuberance 13, producing the same effects. Advantageously, a protuberance 13 of the face 12 is positioned opposite a protuberance 13 of the face 16, so as to reinforce their mutual effect. Positioning in staggered rows is also possible. Additionally or alternatively, in the case where a bushing 15 is inserted, between the neck 8 and the ring 9 or between the neck 8 and the base 4, its face 18 opposite the neck 8 further advantageously comprises at least one annular protuberance 13, producing the same effects. Advantageously, a protuberance 13 of the face 18 is positioned opposite a protuberance 13 of the face 12 or of the face 16, so as to reinforce their mutual effect. Positioning in staggered rows is also possible. Additionally or alternatively, one face, or both faces, of the neck 8 also advantageously comprises at least one annular protuberance 19, producing substantially the same effects. Advantageously, a protuberance 19 of the neck 8 is positioned in staggered rows relative to a protuberance 13 of the face 12, of the face 16 and/or of the face 18, so as to accumulate their mutual effects.

According to another optional feature, more particularly illustrated in FIG. 7, the tank 1 also comprises at least one O-ring 14 so as to reinforce the tightness. For each O-ring 14, a groove is advantageously formed in the face 12, so as to immobilize the O-ring 14. The depth of the groove is, however, such that the O-ring 14 greater protrudes. The effect of such an O-ring 14 is comparable to that of the annular protuberance 13 in that it locally creates an overpressure on the neck 8, increasing the tightness. Additionally or alternatively, at least one O-ring 14 can be positioned between the face 16 and the neck 8. Additionally or alternatively, at least one O-ring 14 can be positioned between the face 18 and the neck 8 if a bushing 15 if present. Advantageously, an O-ring 14 on one side of the neck 8 is positioned opposite an O-ring 14 of the other side of the neck 8, so as to reinforce their mutual effect. Positioning in staggered rows is also possible.

The fasteners 10, 11 are complementary so as to be able to engage with one another and to allow fastening, advantageously mobile between the ring 9 and the base 5. Several embodiments are possible here. According to a first embodiment, the fasteners 10, 11 comprise complementary serrated, fishbone profiles. The ring 9 can then be engaged with the base 4 using a relative pushing force along the axis A. The fishbone profiles then act by nonreturn, maintaining the fastening and the force applied during the engagement. Here, the mobility is in a single direction, of the engagement. The progressiveness of the engagement is obtained modulo one tooth/bone.

According to another embodiment, the fasteners 10, 11 are threaded. Such a feature is advantageous in that a thread makes it possible to perform the fastening of the ring 9 with the base 4 and simultaneously to create, by screwing, a continuous, progressive and significant compression force, in that the helix of the thread performs a first force multiplication, further increased by the multiplication provided by the taper C.

According to a first embodiment illustrated in FIGS. 4 and 5, the first fastener 10, or the base 4, comprises an inner thread. In a complementary manner, the second fastener 11, or the ring 9, comprises an outer thread.

According to another embodiment illustrated in FIGS. 2 and 5, corresponding to the dual situation, the first fastener 10, or the base 4, comprises an outer thread. In a complementary manner, the second fastener 11, or the ring 9, comprises an inner thread. This second embodiment is advantageous in that it offers, fairly simply, as visible in FIGS. 2 and 5, a possibility of avoiding having a visible thread in the pipe 5.

As visible in the figures, the ring 9 is entirely or partially in the sealing jacket 6 and in the tank 1. If the sealing jacket 6 has no opening other than at the neck 8, which is most often the case, the access to the ring 9 can only be done via the pipe 5 and through the neck 8.

Therefore, according to another feature, more particularly illustrated in FIG. 11, the ring 9 has a noncircular inner profile 17 around the axis A. It is thus possible, from the outside of the tank 1, via the pipe 5, to insert a tool having, as male component, the same profile that the inner profile 17 has as female component, and thus to make it possible to rotate the ring 9 about the axis A, in order to engage the fasteners 10, 11, in the event the latter are threaded. Any noncircular inner profile shape 17 may be suitable. According to one preferred embodiment, the inner profile 17 centered on the axis A [is] advantageously regular. According to one preferred embodiment, the inner profile 17 has a hexagonal piercing, which is advantageously regular.

The assembly of such a tank 1 will now be described, in relation with the three FIGS. 8-10. FIG. 8 shows the ring 9 in place, unscrewed so as to release the housing 7 as much as possible. A bushing 15 is in place. The sealing jacket 6 is presented opposite the base 4, its neck 8 opposite the housing 7. FIG. 9 shows the sealing jacket 6 in place in the base 4, its neck 8 in place in the housing 7. From this position, the ring 9 is screwed and approaches the base 4, until reaching the position of FIG. 10, where the screwing of the ring 9 presses, via its face 12, against the neck 8 so as to press it between the ring 9 and the wall 16 of the housing 7. The bushing 15 deforms, if applicable, to reinforce the pressing of the neck 8 between the face 18 of the bushing 15 opposite the neck and the face 16 of the housing 7 and so as to follow the taper C.

The disclosure has been illustrated and described in detail in the drawings and the preceding description. The latter must be considered to be illustrative and provided as an example, and not as limiting the disclosure to this description alone. Many variant embodiments are possible.

The invention claimed is:

1. A tank for pressurized gas comprising:
   a structure having a cylindrical shape along an axis and including at least one axial opening along the axis;
   a base being able to be positioned in said at least one axial opening, and comprising, on an inner side, a housing of revolution shape about the axis and a first fastener, and being pierced with at least one through pipe that is axial along the axis;
   a sealing jacket being flexible and tight, able to cover an inner wall of the structure, and comprising a neck able to be received in the housing;
   a ring of revolution shape about the axis, and comprising a second fastener able to cooperate with the first fastener in order to assemble the ring with the base, on the inner side, by bringing the ring closer to the base along the axis, so as to progressively press the neck between the ring and the base, wherein the ring comes closer to the base following a movement parallel to the axis from an inside of the tank toward an outside and in that a face of the housing opposite the neck and a face of the ring opposite the neck have a taper; and
   a deformable bushing, of revolution shape about the axis, positioned between the face of the ring and the neck.

2. The tank according to claim 1, where the taper is inclusively between 0° and 45° of half cone angle.

3. The tank according to claim 1, where the taper is inclusively between 0° and 30° of half cone angle.

4. The tank according to claim 1, where the taper is inclusively between 0° and 20° of half cone angle.

5. The tank according to claim 1, where the face of the ring has a centrifugal normal and the taper has an opening toward the inside of the tank.

6. A tank for pressurized gas comprising:
   a structure having a cylindrical shape along an axis and including at least one axial opening along the axis;
   a base being able to be positioned in said at least one axial opening, and comprising, on an inner side, a housing of revolution shape about the axis and a first fastener, and being pierced with at least one through pipe that is axial along the axis;
   a sealing jacket being flexible and tight, able to cover an inner wall of the structure, and comprising a neck able to be received in the housing; and
   a ring of revolution shape about the axis, and comprising a second fastener able to cooperate with the first fastener in order to assemble the ring with the base, on the inner side, by bringing the ring closer to the base along the axis, so as to progressively press the neck between the ring and the base, wherein the ring comes closer to the base following a movement parallel to the axis from an inside of the tank toward an outside and in that a face of the housing opposite the neck and a face of the ring opposite the neck have a taper, where the face of the ring has a centripetal normal and the taper has an opening toward the outside of the tank.

7. The tank according to claim 1, where the face of the ring and/or the face of the housing and/or a face of any bushing opposite the neck and/or at least one face of the neck further comprises at least one annular protuberance.

8. The tank according to claim 1, further comprising at least one O-ring along the axis, positioned in a groove arranged in a face opposite the neck.

9. The tank according to claim 1, where the first fastener comprises an inner thread and the second fastener comprises an outer thread.

10. A tank for pressurized gas comprising:
a structure having a cylindrical shape along an axis and including at least one axial opening along the axis;
a base being able to be positioned in said at least one axial opening, and comprising, on an inner side, a housing of revolution shape about the axis and a first fastener, and being pierced with at least one through pipe that is axial along the axis;
a sealing jacket being flexible and tight, able to cover an inner wall of the structure, and comprising a neck able to be received in the housing; and
a ring of revolution shape about the axis, and comprising a second fastener able to cooperate with the first fastener in order to assemble the ring with the base, on the inner side, by bringing the ring closer to the base along the axis, so as to progressively press the neck between the ring and the base, wherein the ring comes closer to the base following a movement parallel to the axis from an inside of the tank toward an outside and in that a face of the housing opposite the neck and a face of the ring opposite the neck have a taper, where the first fastener comprises an outer thread and the second fastener comprises an inner thread.

11. The tank according to claim 1, where the ring has a noncircular inner profile around the axis, so as to allow the ring to be set in rotation about the axis, using a tool, from the outside of the tank.

12. The tank according to claim 11, wherein the noncircular inner profile is hexagonal.

13. A vehicle comprising: a tank, the tank comprising the structure, base, sealing jacket, deformable bushing and ring according to claim 1.

* * * * *